(12) United States Patent
Algazi et al.

(10) Patent No.: US 7,039,813 B2
(45) Date of Patent: May 2, 2006

(54) SYSTEM AND METHOD FOR BIOMETRIC VERIFICATION IN A DELIVERY PROCESS

(75) Inventors: Allan Stuart Algazi, Succasunna, NJ (US); Salvatore Anthony Sparacino, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 175 days.

(21) Appl. No.: 10/283,405

(22) Filed: Oct. 29, 2002

(65) Prior Publication Data

US 2004/0083371 A1     Apr. 29, 2004

(51) Int. Cl.
*H04L 9/00*  (2006.01)

(52) U.S. Cl. .................. 713/186; 713/185; 713/182

(58) Field of Classification Search ............... 713/186, 713/202; 235/184
See application file for complete search history.

(56) References Cited

U.S. PATENT DOCUMENTS

| | | | | |
|---|---|---|---|---|
| 5,420,924 A | * | 5/1995 | Berson et al. ............... 713/186 |
| 5,767,496 A | * | 6/1998 | Swartz et al. ............. 235/462.1 |
| 5,790,674 A | * | 8/1998 | Houvener et al. .......... 713/185 |
| 5,815,252 A | * | 9/1998 | Price-Francis ................ 356/71 |
| 5,825,871 A | * | 10/1998 | Mark .................... 379/357.03 |
| 5,872,848 A | * | 2/1999 | Romney et al. ............ 713/176 |
| 5,917,913 A | * | 6/1999 | Wang ........................... 705/67 |
| 5,974,147 A | * | 10/1999 | Cordery et al. ............... 705/62 |
| 6,018,739 A | * | 1/2000 | McCoy et al. .............. 707/102 |
| 6,092,192 A | * | 7/2000 | Kanevsky et al. .......... 713/186 |
| 6,140,939 A | * | 10/2000 | Flick ..................... 340/825.69 |
| 6,307,956 B1 | * | 10/2001 | Black ......................... 382/124 |
| 6,549,892 B1 | * | 4/2003 | Sansone ..................... 705/401 |
| 6,751,734 B1 | * | 6/2004 | Uchida ....................... 713/186 |
| 6,819,219 B1 | * | 11/2004 | Bolle et al. ................ 340/5.52 |
| 2001/0032096 A1 | * | 10/2001 | Uchida et al. .................. 705/1 |
| 2002/0103653 A1 | * | 8/2002 | Huxter |
| 2002/0138742 A1 | * | 9/2002 | Hamid et al. |
| 2003/0050732 A1 | * | 3/2003 | Rivalto |
| 2003/0084305 A1 | * | 5/2003 | Siegel et al. ................ 713/186 |
| 2003/0159052 A1 | * | 8/2003 | Lee et al. |

* cited by examiner

*Primary Examiner*—Ayaz Sheikh
*Assistant Examiner*—Pramila Parthasarathy
(74) *Attorney, Agent, or Firm*—Fay Kaplun & Marcin, LLP (57) ABSTRACT

Described is a method and system for providing a verified delivery of a package. First, registration information is obtained from a recipient; the registration information includes a biometric identification of the recipient. A delivery service obtains the package from a sender which is addressed to the recipient and forwards the package to the recipient. At the point of delivery, the delivery service obtains a further biometric identification from the recipient using a portable device which includes a biometric reader. The delivery service releases the package to the recipient only if the biometric identification is substantially identical to the further biometric identification.

16 Claims, 7 Drawing Sheets

SYSTEM AND METHOD FOR BIOMETRIC VERIFICATION IN A DELIVERY PROCESS

FIELD OF THE INVENTION

The present invention relates to a system and method for verification of a recipient's identity by a delivery service (e.g., United States Postal Service [USPS], United Parcel Service [UPS], Federal Express [FedEx], etc.) by using an individual's biometric identifiers (e.g., fingerprint, voice, retina, etc.)

BACKGROUND

Delivery services have been requiring for many decades recipients to sign for packages or parcels in order to insure that the intended person received the shipment. With the advent of new technology, the pen-and-paper method of recording the recipient's identity has become obsolete. Presently, many of the delivery services record the signature electronically and store that signature in a central database which may be accessed later by the sender (e.g., through a website) for verification purposes. However, this system of verification still relies on capturing only the signature of the recipient and does not verify his identity in any other way.

There are a number of problems that arise when such conventional systems are utilized in secure deliveries. For example, the secure deliveries may be packages that contain precious (e.g., gems, bonds, secure documents, etc.) or dangerous items (e.g., chemical and biological agents) which are directed to a very specific recipient (e.g., "diamond district" of New York City, brokerage houses, law firms, laboratories, etc.). The mere recording of the recipient's signature may be insufficient in these situations because it cannot verify if the intended recipient in fact received the package. Sometimes the recipient may have a designated representative who is authorized to receive and sign for the packages. However, when the authorized representative is absent another individual may simply sign for the authorized representative, and thus gaining the access to the contents of the package.

SUMMARY OF THE INVENTION

The present invention relates to a method and system for providing a verified delivery of a package. First, registration information is obtained from a recipient; the registration information includes a biometric identification of the recipient. A delivery service obtains the package from a sender which is addressed to the recipient and forwards the package to the recipient.

At the point of delivery, the delivery service obtains a further biometric identification from the recipient using a portable device which includes a biometric reader. The delivery service releases the package to the recipient only if the biometric identification is substantially identical to the further biometric identification.

BRIEF DESCRIPTION OF THE DRAWINGS

The accompanying drawings are included to provide a further understanding of the invention and are incorporated in and constitute part of the specification, illustrate several embodiments of the invention and, together with the description, serve to explain examples of the present invention. In the drawings.

DETAILED DESCRIPTION

The present invention is directed at a system and method for a biometric verification of a recipient's identity upon delivery of the shipment by a delivery service.

Figure 1A:
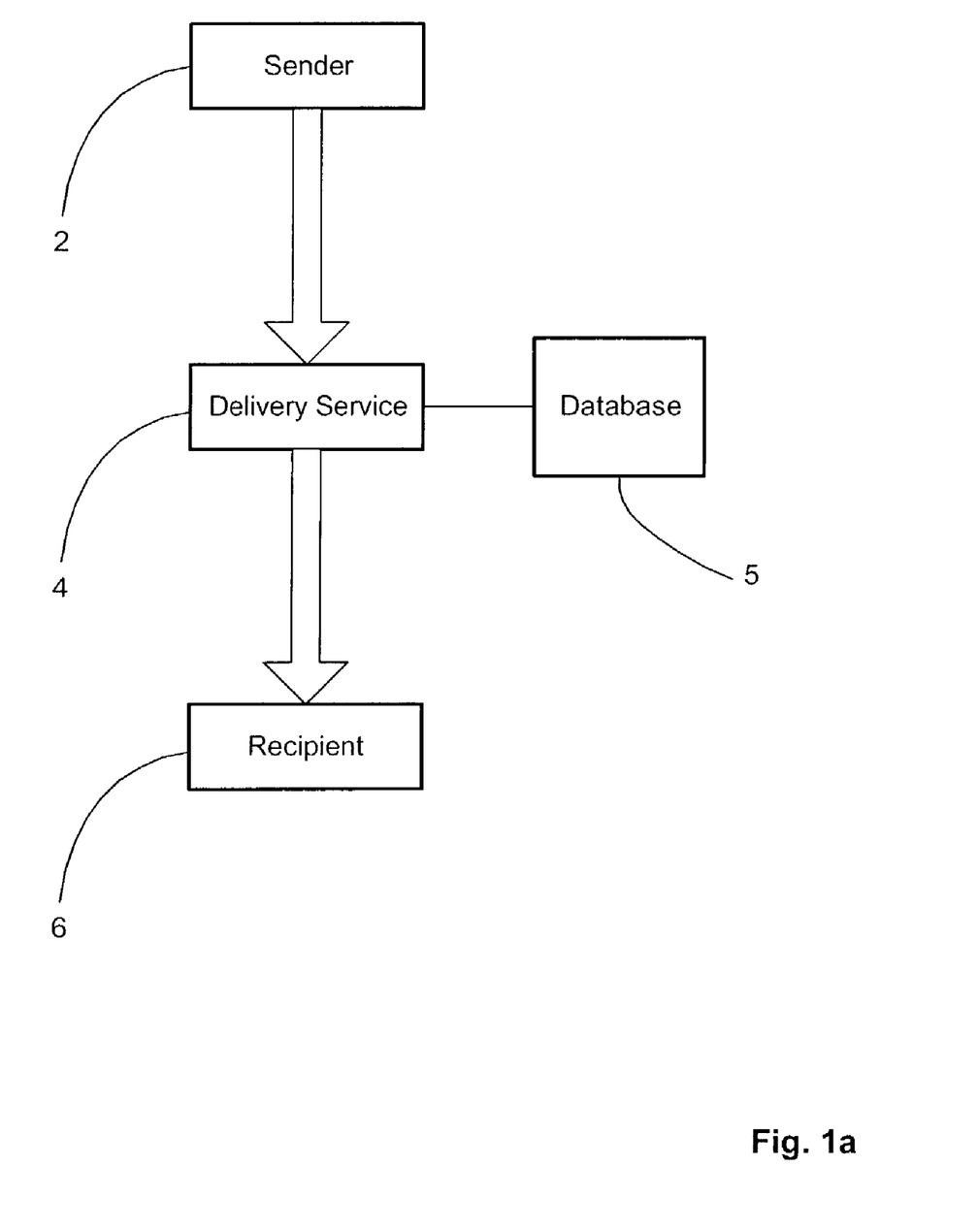
FIG. 1a shows an exemplary system for providing a verified delivery of a package according to the present invention.

FIG. 1a shows an exemplary flow of a package from a sender 2 to a recipient 6 using a delivery service 4. The sender 2 may be a particular entity that needs to ship, e.g., precious or dangerous merchandise. First, the sender 2 prepares the merchandise for shipment by placing it in a package and attaching a special label. The label may notify the delivery service 4 that the package must only be delivered to the designated recipient 6. In addition, the sender 2 may specify which representatives of the recipient 6 are authorized to receive the package. The information pertaining to the authorized representatives is stored by the delivery service 4 in a database 5. The database 5 may be used by the delivery service 4 to store the biometric identifiers of the authorized representatives of the recipient 6.

The sender 2 then forwards the package to the delivery service 4 (e.g., the sender 2 either drops off the package at a specified location or the delivery service 4 picks up the package directly from the sender 2). The sender 2 may also insure the contents of the package or request a return receipt in order to confirm the delivery, e.g., using certified mail, electronic delivery confirmation.

The delivery service 4 may be any local, nationwide or worldwide parcel or mail services (e.g., UPS, USPS, etc.). The delivery service 4 is notified (e.g., via the special packaging or the label) that the package may be delivered only to the authorized representatives. Upon obtaining the package from the sender 2, the delivery service 4 inputs the identities of the authorized representatives into the database 5. The package then travels through the distribution network of the delivery service 4 to a local branch office near which the recipient 6 is located. Once the package reached the recipient's 6 local branch office, the delivery service 4 will attempt to deliver the package.

As mentioned above, the recipient 6 may be any entity that regularly receives packages that contain precious or dangerous items. The recipient 6 may designate representatives who are authorized to receive the packages. The authorized representative are registered with the delivery service 4. In particular, biometric identification data of the authorized representative is obtained and stored in the database 5. Based on such data, a card 20 shown in FIG. 2 may be obtained. Upon registering the authorized representatives, the recipient 6 is ready to receive the packages using the system of biometric verification according to the present invention.

Figure 5:
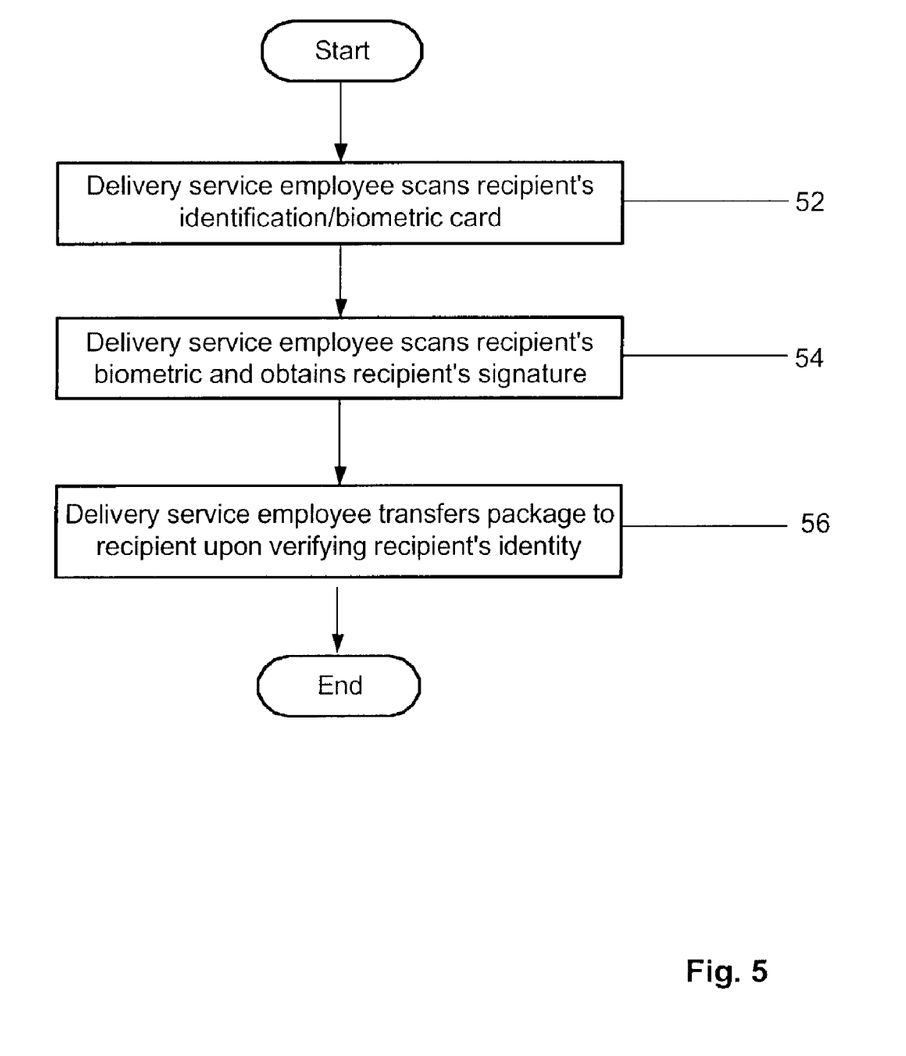
FIG. 5 shows a flow chart illustrating an exemplary embodiment of a method for verifying the recipient's identity using the identification card according to the present invention.

During delivery of the package, the delivery service 4 may obtain the signature of the authorized representative and the corresponding biometric identifier for the verification purposes using a scanning device 30 (shown in FIG. 3) and the card 20. This process is shown in FIG. 5 and is described in more detail below. The identity of the authorized representative is verified by comparing the biometric identifier obtained using the scanning device 30 to the biometric identifier stored in the database 5. If the biometric identifiers match then the delivery service 4 may release the package into possession of the authorized representative.

Figure 4:
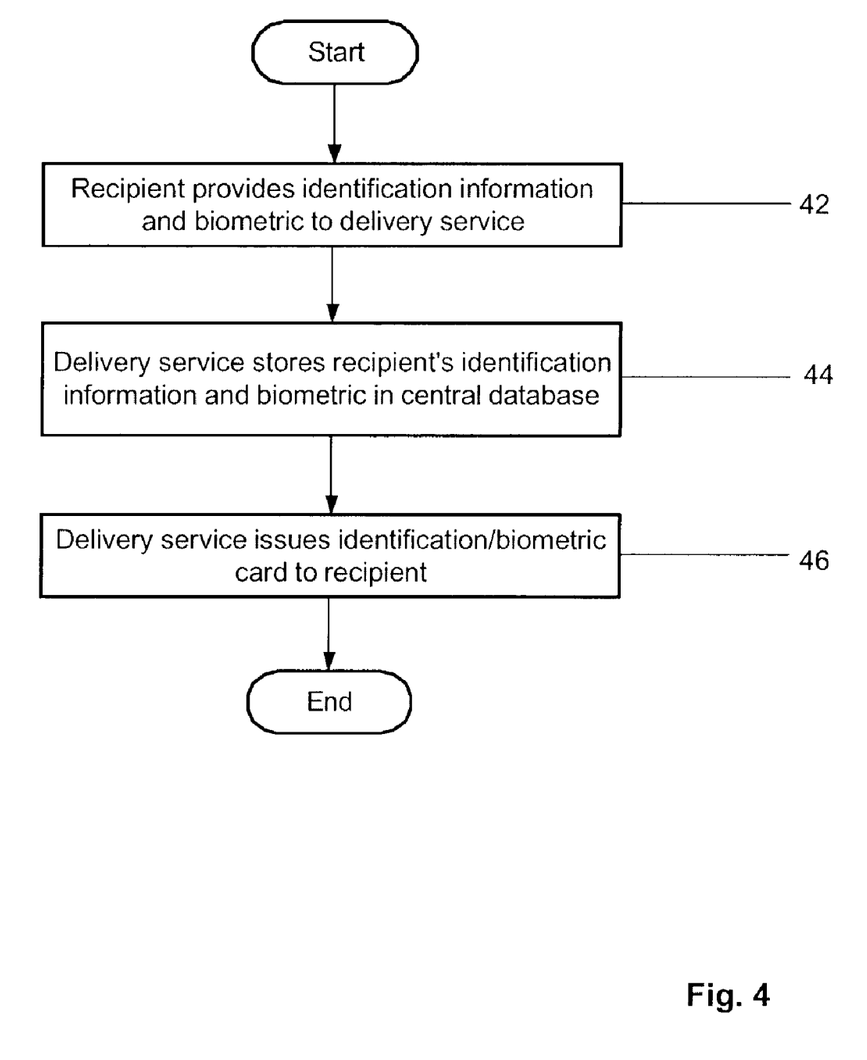
FIG. 4 shows a flow chart illustrating an exemplary embodiment of a method for the recipient to register with the delivery service according to the present invention.

The exemplary card 20 which contains data on individual authorized representative may be issued by the delivery service 4. This exemplary process is shown in FIG. 4 and is described in more detail below. The card 20 may serve as an additional layer of security, since the authorized representative has to show the card to the delivery service 4 in order to obtain the package.

Figure 2:
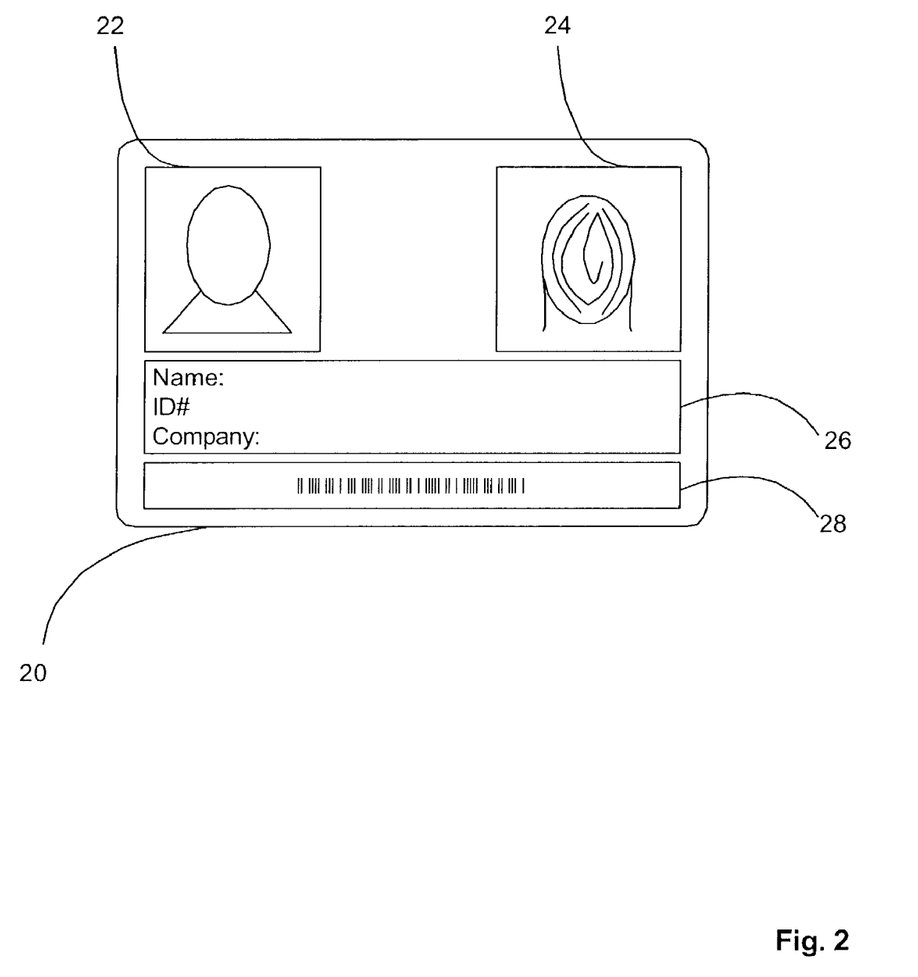
FIG. 2 shows a schematic diagram of an exemplary embodiment of an identification card according to the present invention.

The card 20 may consist of the authorized representative's photograph 22, a biometric identifier 24, identification information 26 (e.g., name, address, company, etc.), and a barcode 28. The barcode 28 may be a two-dimensional barcode which stores the above-identified information. The biometric identifier in this embodiment is a fingerprint 24. The present invention may also utilize any other biometric identifier such as, a retina scan, a voice recording, DNA, etc. Such biometric identifiers are more complex than a fingerprint and, as the result, they may require additional digital storage space than a fingerprint identifier. Therefore, a system which utilizes fingerprints as the biometric identifier may be easier to implement and it may be more cost-efficient. The biometric data and other information may also be stored on a computer chip which may be embedded into the card 20 and may be read by the scanning device 30.

The components of the card 20 may be located anywhere on the card 20. The photograph 22, the fingerprint 24, and the information 26 appearing on the card 20 are supplied by the recipient 6 and may be independently verified by the delivery service 4 prior to the issuance of the card 20. The barcode 28 allows the delivery service 4 to communicate with the card 20 and to extract the corresponding information.

Figure 3:
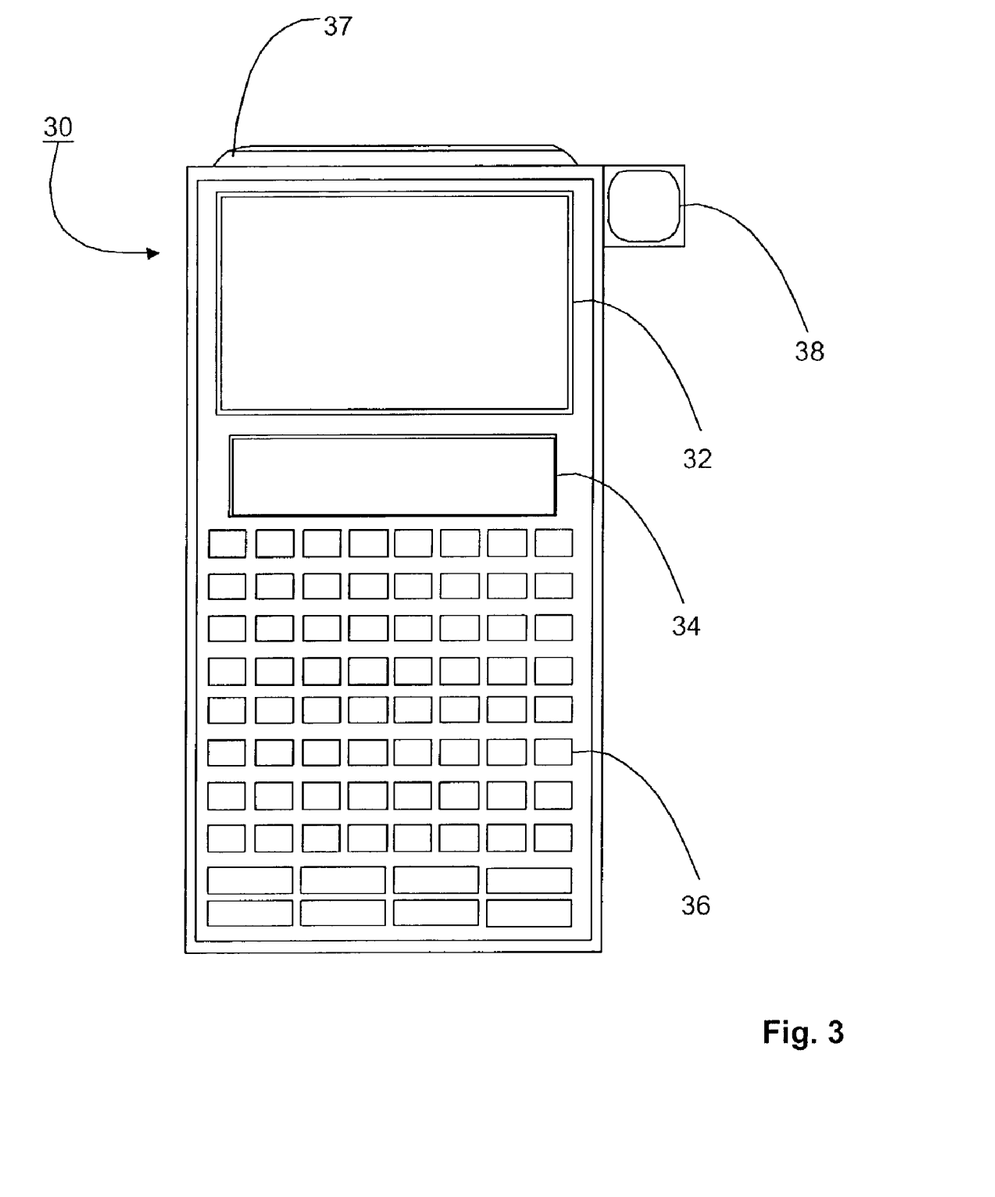
FIG. 3 shows a schematic diagram of an exemplary embodiment of a scanning device according to the present invention.

FIG. 3 shows the scanning device 30 which may include a display screen 32, a pointer pad 34, an input device (e.g., a keyboard 36), a barcode scanner 37 and a biometric scanner (e.g., a fingerprint reader 38). The scanning device 30 is used by the delivery service 4 during the delivery of the package to verify the identity of the authorized representatives and to record the delivery transaction. The device 30 may have a direct access (e.g., a wireless access) to the database 5 which allows it to extract necessary information from the database 5. In an alternative exemplary embodiment of the present invention, the necessary information may be downloaded to the scanning device 30 before the delivery attempt of the package to the recipient is made.

To verify the receipt of the package, the device 30 captures the authorized representative's signature using the pad 34. The device 30 scans the barcode 28 located on the card 20 using the scanner 37 to obtain the biometric identifier. Then, the device 30 reads the fingerprint 24 of the authorized representative using the reader 38. Subsequently, the device 30 compares the data obtained from the card 20 and the reader 38 to the biometric identifier stored in the database 5.

FIG. 4 shows an exemplary method for registering the authorized representative with the delivery service 4. In step 42, the recipient 6 provides the delivery service 4 with the authorized representative's photograph 22, the fingerprint 24, and the information 26. The delivery service 4 may independently verify that this data is correct by performing a background check. The delivery service 4 may also verify the photograph 22 and the fingerprint 24 when the authorized representative receives the card 20.

In step 44, the data (e.g., the fingerprint 24, the information 26, etc.) collected by the delivery service 4 is stored in the database 5. By storing the data in the database 5, the delivery service 4 may prevent unauthorized individuals from abusing the system (e.g., attempting to register as a recipient's representative 6). The delivery service 4 may be able to prevent fraud by, e.g., removing entries of those individuals who lost their card 20 or who are no longer employed by the recipient 6.

In step 46, the delivery service 4 generates the card 20 and issues the card 20 to the recipient 6. The card 20 may be delivered to the recipient 6. The authorized representatives may have to personally pick up the card 20. After the step 46, the recipient 6 is ready to receive secured packages.

FIG. 5 shows an exemplary method for verifying the identity of the recipient 6 or its authorized representative. In step 52, the authorized representative presents the card 20 to an employee of the delivery service 4 ("EDS"). After verifying that the card 20 belongs to the authorized representative (e.g., by verifying the photograph 22), the EDS scans the barcode 28 using the scanner 37. The device 30 obtains data about the authorized representative from the card 20 and uses that data to communicate with the database 5. The device 30 contacts the database 5 to determine first, if the cardholder is in fact the authorized representative of the eligible recipients 6. If the cardholder is authorized to receive the package, then the device 30 communicates with the database 5 to obtain the corresponding biometric identifier.

In step 54, the delivery service 4 scans the fingerprint of the cardholder using the reader 38. In step 56, the device 30 compares the fingerprint 24 obtained using the reader 38 in step 54 to the fingerprint 24 obtained from the database 5 in step 52. If the two fingerprints match, then the cardholder is an authorized representative who may receive the package.

Figure 6:
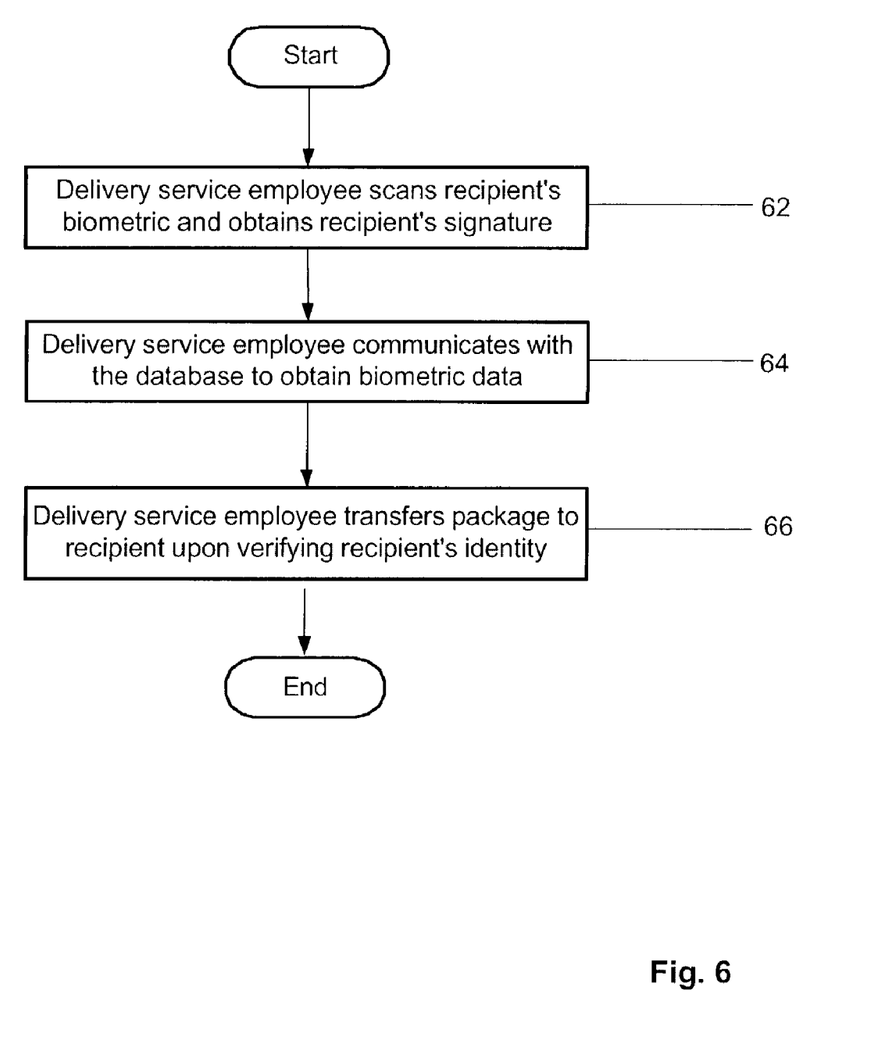
FIG. 6 shows a flow chart illustrating an exemplary embodiment of a method for verifying the recipient's identity according to the present invention.

FIG. 6 shows an exemplary method for verifying the identity of the recipient 6 without using the card 20. In step 62, the delivery service 4 reads the fingerprint 24 of an intended representative using the reader 38 in a substantially similar manner as described in step 54. In step 64, the device 30 contacts the database 5 to determine if the intended representative is one of the authorized representatives of the recipients 6. If the intended representative is the authorized representative who may receive the package, then the device 30 searches the database 5 for a corresponding biometric identifier. To expedite the search, an additional information about the intended representation may be utilized (e.g., a name, a social security number, etc.). In step 66, the device 30 compares the fingerprint obtained in step 64 to the fingerprint 24 obtained from the database 5 in step 62. If the fingerprints match, then the intended representative is authorized to receive the package.

One of the advantages of this exemplary method is that the authorized representative does not have to carry the card 20, and thus, the registration process with the delivery service 4 may be significantly shorter. In addition, there is no risk of the card 20 being used by an unauthorized person. One of the advantages of the method which utilized the card 20 is that while it requires a longer registration period it provides an additional layer of security. In particular, the authorized representative has to show the card 20 prior to any subsequent steps of the verification procedure.

Another advantage of the present invention is that it provides additional security to the delivery services 4. Presently, the package delivery system is incapable of verifying that a person who received the package was in fact the authorized representative of the recipient 6.

Figure 1B:
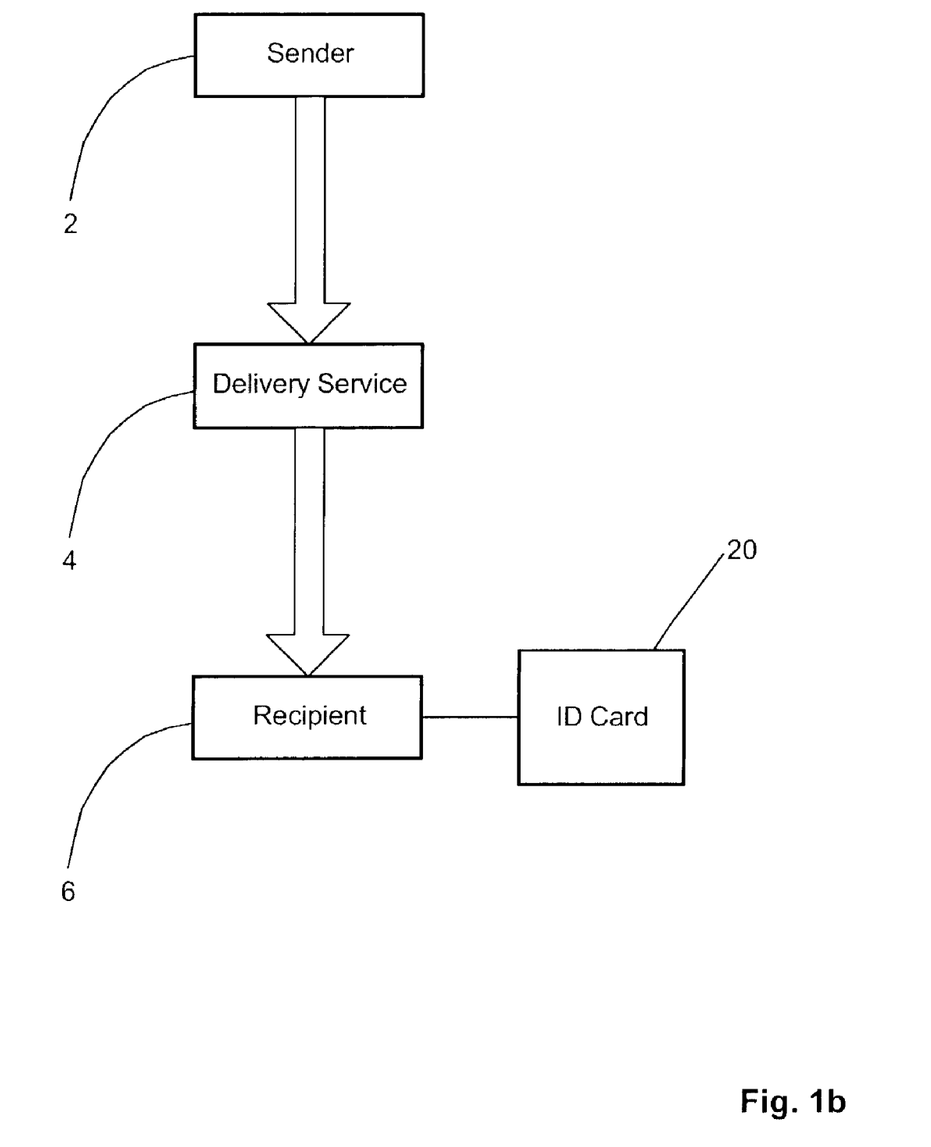
FIG. 1b shows an exemplary system for providing a verified delivery of a package according to the present invention.

FIG. 1b shows an alternative system for providing a verified delivery of a package according to the present invention. In particular, this exemplary system has no database 5. Instead, the biometric data of the recipient 2 is stored only on the card 20. The card 20 may have a plurality of security features to prevent any alterations. For example, the data stored on the card 20 may be encrypted using a public-private encryption system (e.g., PGP). In addition, the access to the data stored on the card 20 may be password-protected. Once the card 20 is generated, it is transferred into the possession of the recipient 2.

When the package is delivered by the delivery service 4 to the recipient 2, the biometric data is obtained from the recipient 2 using the device 30. Then, the biometric data is obtained from the card 20, e.g., by scanning the barcode. In addition, the device 30 checks if the data stored on the card 20 was alerted in any way using predetermined security features. Furthermore, in the alternative exemplary embodiment, the agent of the delivery server 4 and/or the recipient 2 must enter corresponding passwords/keys in order for the device 30 to access and/or decrypt the biometric data stored on the card 20.

The biometric data obtained directly from the recipient 2 and the card 20 are compared. If the data are substantially similar, the package is released to the recipient 2. Once this transaction is completed, the device 30 may retain only a record of the completed transaction and the biometric data is erased from the device 30. The record of the completed transaction may be utilized for an electronic delivery confirmation.

One of the advantages of this alternatively exemplary embodiment is absence of the database 5. This allows to simplify the verification process since there is no need of additional efforts/resources for collection, storage and access to the data. In addition, there are no privacy concerns with regard to this data.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method for providing a verified delivery of a package, comprising the steps of:
   obtaining registration information from a recipient, the registration information including a signature sample and a biometric identification of the recipient;
   generating an identification card for the recipient;
   storing the registration information on the identification card;
   further storing the registration information in a computer database;
   providing the identification card to the recipient;
   obtaining the package from a sender which is addressed to the recipient;
   forwarding the package to the recipient, wherein a point of delivery is the address of the recipient;
   verifying using the identification card at the point of delivery, that the recipient is authorized to receive the package;
   obtaining the biometric identification of the recipient from the identification card using a portable device, the portable device including a biometric reader and a signature pad;
   obtaining a further signature sample and a further biometric identification from the recipient at the point of delivery using the portable device;
   obtaining the biometric identification from the computer database using the portable device;
   releasing the package to the recipient only if the biometric identification obtained from the database, the biometric identification obtained from the identification card and the further biometric identification are matching and (ii) the sample signature matches the further sample signature; and
   after releasing, removing the biometric identification and the further biometric identification from the portable device.

2. The method according to claim 1, further comprising the step of:
   before the storing step, independently verifying an identity of the recipient.

3. The method according to claim 1, further comprising the steps of:
   before the generating the card step, encrypting the biometric identification using a predetermined encryption system; and
   before the obtaining step, decrypting the biometric identification using the predetermined encryption system.

4. The method according to claim 1, wherein the biometric identification is stored on the identification card in the form of a two-dimensional bar code and wherein the portable device includes a two-dimensional barcode reader, the method further comprising the step of:
   obtaining the biometric identification by scanning the barcode of the identification card using the portable device.

5. The method according to claim 1, wherein the biometric identification includes at least one of a retina data, a finger print and a voice data sample.

6. The method according to claim 1, wherein the portable device includes a wireless communication arrangement, the computer database being coupled to a wireless communication network, the method further comprising the step of:
   obtaining the biometric identification from the database using the portable device via the wireless communication network.

7. The method according to claim 1, further comprising the step of:
   providing and storing the further biometric identification in the computer database.

8. The method according to claim 1, further comprising the step of:
   after the releasing step, retaining a record of the release of the package to the recipient by the portable device.

9. A system for providing a verified delivery of a package, comprising:
   a computing arrangement including a biometric reader, the computer arrangement obtaining a registration information from a recipient, the registration information including a signature sample and a biometric identification of the recipient; and a portable device including a portable biometric reader and a signature pad, wherein an identification card is generated for and provided to the recipient, the registration information being stored on the identification card, wherein the package is obtained from a sender and addressed to the recipient, the package being forwarded to the recipient, wherein a point of delivery is the address of the recipient, wherein the identification card, at the point of delivery, is used to verify that the recipient is authorized to receive the package, wherein the biometric identification of the recipient is obtained from the identification card using the portable device, wherein a further sample signature and a further biometric identification is obtained from the recipient using the portable device at the point of delivery, wherein the package is released to the recipient only if (i) the biometric identification matches the further biometric identification and (ii) the sample signature matches the further sample signature, and wherein after the package is released, the biometric identification and the further biometric identification are removed from the portable device.

10. The system according to claim 9, wherein the registration information is stored in a computer database, and wherein, before the package is released, the biometric identification is provided from the computer database to the portable device.

11. The system according to claim 10, wherein before the registration information is stored in the database, an identity of the recipient is independently verified.

12. The system according to claim 9, wherein before the card is generated, the biometric identification is encrypted using a predetermined encryption system, and wherein before the biometric identification is obtained from the card, the biometric identification is decrypted using the encrypting system.

13. The system according to claim 9, wherein the biometric identification is stored on the identification card in the form of a two-dimensional bar code, the portable device including a two-dimensional barcode reader, the biometric identification being obtained by scanning the barcode of the identification card using the portable device.

14. The system according to claim 9, wherein the biometric identification includes at least one of a retina data, a finger print and a voice data sample.

15. The system according to claim 9, wherein the portable device includes a wireless communication arrangement, the computer database being coupled to a wireless communication network, the biometric identification being obtained using the portable device via the wireless communication network.

16. The system according to claim 9, wherein after the package is released, a record of the release of the package to the recipient is retained by the portable device.

* * * * *